(12) United States Patent
Mellor (10) Patent No.: US 12,511,171 B1
(45) Date of Patent: Dec. 30, 2025

(54) SYSTEMS AND METHODS FOR DETERMINING OPTIMAL CLUSTER OPTIONS FOR CLOUD-BASED DATA PROCESSING JOB FROM A SET OF MACHINE CONFIGURATIONS

(71) Applicant: NBCUniversal Media, LLC, New York, NY (US)

(72) Inventor: David Mellor, Lynnfield, MA (US)

(73) Assignee: NBCUniversal Media, LLC, New York, NY (US)

( * ) Notice: Subject to any disclaimer, the term of this patent is extended or adjusted under 35 U.S.C. 154(b) by 962 days.

(21) Appl. No.: 17/319,823

(22) Filed: May 13, 2021

(51) Int. Cl.
G06F 9/50 (2006.01)
G06F 9/38 (2018.01)
G06F 9/445 (2018.01)

(52) U.S. Cl.
CPC .......... *G06F 9/5072* (2013.01); *G06F 9/3836* (2013.01); *G06F 9/44505* (2013.01); *G06F 9/5038* (2013.01)

(58) Field of Classification Search
CPC .................................................. G06F 9/5072
See application file for complete search history.

(56) References Cited

U.S. PATENT DOCUMENTS

| 8,775,282 B1* | 7/2014 | Ward, Jr. | H04L 41/0896 709/224 |
| 11,579,937 B1* | 2/2023 | Giraldo | G06F 9/5072 |
| 2007/0180451 A1* | 8/2007 | Ryan | G06F 9/5072 718/104 |
| 2008/0077898 A1* | 3/2008 | Subasic | G06F 30/392 716/135 |
| 2011/0026702 A1* | 2/2011 | Bot | H04M 3/4228 379/210.02 |
| 2015/0178052 A1* | 6/2015 | Gupta | G06F 8/34 717/105 |
| 2015/0242242 A1* | 8/2015 | Clayton | G06F 9/5083 709/224 |
| 2019/0171494 A1* | 6/2019 | Nucci | G06N 20/00 |

* cited by examiner

*Primary Examiner* — Jorge A Chu Joy-Davila
(74) *Attorney, Agent, or Firm* — Fletcher Yoder, P.C.

(57) ABSTRACT

A tangible, non-transitory, machine-readable medium, comprising machine-readable instructions that, when executed by one or more processors, cause the one or more processors to determine an optimal cluster option for a data processing job from a set of machine configurations, wherein the optimal cluster option comprises an optimal configuration and a corresponding optimal number of machines having the optimal configuration, determine, from the set of machine configurations, one or more equivalent cluster options comprising equivalent configurations and a corresponding equivalent number of machines having the equivalent configuration to the optimal configuration, generate an ordered cluster options list that prioritizes the optimal cluster option and the one or more equivalent cluster options based upon long-term interruption rates, short-term availability, expected pricing or any combination thereof, and request, based on the ordered cluster options list, allocation of a cluster to implement the data processing job.

16 Claims, 4 Drawing Sheets

SYSTEMS AND METHODS FOR DETERMINING OPTIMAL CLUSTER OPTIONS FOR CLOUD-BASED DATA PROCESSING JOB FROM A SET OF MACHINE CONFIGURATIONS

BACKGROUND

The present disclosure generally relates to optimizing cost for big data processing and, more particularly, to identifying and requesting use of cost-effective machines to process jobs related to big data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

In the era of big data, enterprises may need to process vast amounts of data every day. As a result, processing the large volumes of data may require multiple machines with multiple different types of configurations depending on the job. However, it may prove incredibly costly for the enterprise to maintain the physical machines on premises as required to process large amounts of data. Enterprises may use third-party cloud services that provide cloud service machines to perform the desired job processing with different cost structures for different types of cloud services. For example, third-party cloud services may allow enterprises to utilize uninterruptible or interruptible machines for data processing. The cost for utilizing interruptible machines may be significantly lower than the costs for utilizing un-interruptible machines, but the tradeoff is that using interruptible machines could make the job completion less reliable since another party could take over the interruptible machine by paying a higher price.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, one or more processors may execute a tangible, non-transitory, machine-readable medium to cause the one or more processors to identify an optimal configuration and respective optimal number of machines for implementation of a big data processing job, identify one or more equivalent cluster options comprising equivalent configurations and respective equivalent number of machines to the optimal configuration and respective optimal number of machines, prioritize, in a prioritized order in an ordered cluster options list, the optimal cluster option and the one or more equivalent cluster options, based upon respective known long-term interruption rates, short-term availability, expected pricing or any combination thereof, and iteratively electronically request, in the prioritized order, allocation of a cluster to implement the big data processing job using the prioritized optimal cluster option and the one or more equivalent cluster options, until the allocation of the cluster succeeds or the optimal cluster option and the one or more equivalent cluster options are depleted.

In another embodiment, a system may include a data lake comprising data to be processed, cluster allocation logic, configured to select a particular cluster option, from multiple cluster options, to allocate as a cloud service cluster tasked with performing a processing job on the data, where the particular cluster option is selected based upon respective known long-term interruption rates, short-term availability, expected pricing or any combination thereof of the plurality of cluster options, and a job scheduler communicatively coupled to the cluster allocation logic, configured to schedule a processing job to process the data, by requesting allocation of the cloud service cluster in accordance with the particular cluster option selected by the cluster allocation logic.

In a further embodiment, a method may include identifying an optimal configuration and respective optimal number of machines for implementation of a big data processing job, identifying one or more equivalent cluster options comprising equivalent configurations and respective equivalent number of machines to the optimal configuration and respective optimal number of machines, prioritizing, in a prioritized order in an ordered cluster options list, the optimal cluster option and the one or more equivalent cluster options, based upon respective known long-term interruption rates, short-term availability, expected pricing or any combination thereof, and iteratively electronically requesting, in the prioritized order, allocation of a cluster to implement the big data processing job using the prioritized optimal cluster option and the one or more equivalent cluster options, until the allocation of the cluster succeeds or the optimal cluster option and the one or more equivalent cluster options are depleted.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed above, a big data platform may be utilized in various contexts, such as in advertising, marketing, business, research and development, or the like. As a result, the big data platform may include machines configured to receive and process large amounts of data (e.g., hundreds of gigabytes or terabytes of data) every single day. The machines may be owned and operated by the enterprise controlling the big data platform. However, operating and maintaining the machines required to process vast amounts of data may prove costly to the enterprise controlling the big data platform. Thus, it has become increasingly more common for the enterprises who utilize big data platforms to purchase cloud-based operating and processing capabilities through a third-party service provided by a third-party service provider.

The third-party service provider may operate and lease cloud-based machines to the enterprises through direct, on-demand markets and/or an interruptible machine market. The on-demand market may allow the enterprises to make sure that they will be able to utilize the cloud-based machines for as long as they need until the processing job is completed without interruption. By contrast, the interruptible machine market allows the enterprises to utilize a cost effective option by requesting machines that were not purchased through the on-demand market. The downside of the interruptible market is that the machine running the current processes may be interrupted if another enterprise decides to purchase the machine through the on-demand market. To remedy this, an algorithm may be used for identifying and requesting one or more equivalent cloud-based machines from the third-party service interruptible machine market to optimize cost, that are unlikely to result in interrupted processing by preferential processing of the "on demand" market, to help ensure the completion of the requested processes via the big data platform. These techniques also increase the efficient use of available machines and resources that would otherwise be running idle.

Figure 1:
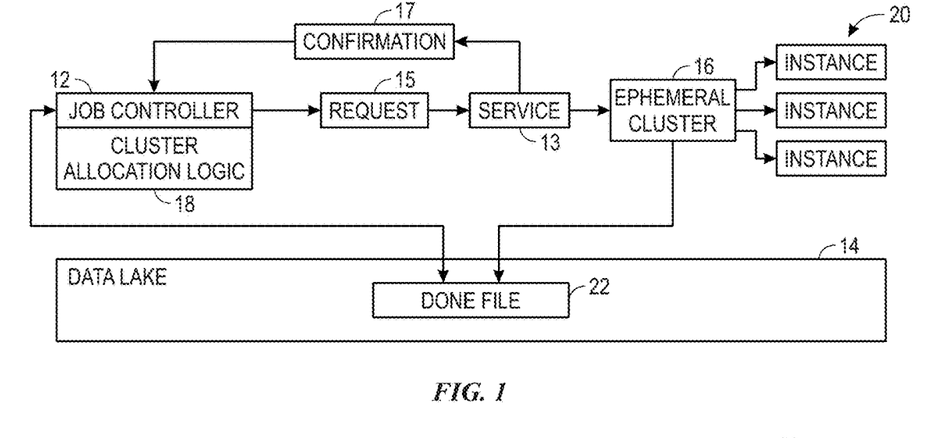
FIG. 1 illustrates a big data processing system, in accordance with an embodiment.

With the foregoing in mind, FIG. 1 illustrates an efficiency system 10 communicatively coupled to a data platform that provides efficient execution of data processing to reduce processing costs while increasing utilization of under-utilized machines of a cloud-based data processing service. Referring to FIG. 1, the efficiency system 10 may include a job controller 12 to carry out the data processing operations (e.g., jobs). The job controller 12 may be one or more processors that facilitate one or more jobs to process data.

The job controller 12 may access a data lake 14 to obtain unprocessed data. The data lake 14 may be a local or cloud-based data repository that receives data from an external source. In some embodiments, the data lake 14 may include one or more data repositories to accommodate the vast amounts of data required to run jobs. In certain embodiments, the data lake 14 may include partitions for different types of data that is stored within the one or more data repositories. The data lake 14 may receive the data at the same time every day or at any point during the day.

The data stored in the data lake 14 may be related to data analytics. Data analytics may utilize predictive analytics, user behavior analytics, or the like to analyze data sets too large or complex to be analyzed using conventional means. As discussed above, the data may be sourced from advertising data, marketing data, business data, research and development data, government data, healthcare data, Internet browsing data, and/or the like. In order to process the data and run the required jobs for the processing of the data, the jobs may require one or more machines. However, as discussed above, operating and maintaining the one or more machines required to process vast amounts of data may prove costly to the enterprise controlling the efficiency system 10.

The job controller 12 may perform data cleaning operations on the data lake 14 to ensure that the data sourced from the data lake 14 is usable for data processing. In some embodiments, the job controller 12 may parse through the data lake 14 utilizing certain parameters to delete data that is deemed not useful for processing and/or otherwise only acquire data that is useful for processing.

As such, the job controller 12 may utilize one or more cloud-based machines provided by a third-party provider on the big data platform through a service 13 provided by the third-party provider to process the big data. The service 13 may include an interface to access the one or more cloud-machines provided by the third-party provider. In some embodiments, the service 13 may be run by a party requesting the utilization of the one or more cloud-based machines. The job controller 12 may send a request 15 to the service 13 to utilize the one or more cloud-based machines to process the big data. The service 13 may transmit a confirmation message 17 back to the job controller 12 based at least in part upon the request 15. The confirmation message 17 may include feedback information including the validity, the completion, or the failure of completion of the request 15. Each job may be processed as an ephemeral cluster 16 on the one or more cloud-based machines. The ephemeral cluster 16 may include one or more components of a specific job for processing data from the data lake 14.

To create the request to the service 13 to utilize the data platform to create the ephemeral cluster 16, the job controller 12 may utilize cluster allocation logic 18, which may be a component of the job controller 12 and/or an independent component communicatively coupled to the job controller 12. The cluster allocation logic 18 may include one or more algorithms which, when executed, determine a desired makeup of the ephemeral cluster 16. By way of example, the job controller 12 may identify the makeup of the ephemeral cluster 16, by identifying particular machine types and/or a number of machines to request to request for the ephemeral cluster 16. As may be appreciated, the job controller 12 may account for the makeup that is capable of processing an identified job, while also attempting to minimize interruption caused by processing of the un-interruptible market, which allows for processing that can interrupt/supersede processing by a cluster of machines purchased through the interruptible market. In some embodiments, the cluster allocation logic 18 may utilize the one or more processors utilized by the job controller 12. In other embodiments, the cluster allocation logic 18 may be performed on another set of one or more processors communicatively coupled to the job controller 12. In identifying the makeup of the ephemeral cluster 16, the one or more algorithms of the cluster allocation logic 18 may utilize information from the data lake 14, the job controller 12, historical data of past ephemeral clusters, or the like.

The ephemeral cluster 16 may include one or more instances 20, which run the one or more components of the specific job. The one or more instances 20 may include each of the one or more processes that in totality comprise the ephemeral cluster 16. The instance 20 may be related to a computing instance on a machine that runs each of the one or more processes. The machine may be run on the cloud-based machine.

Once the job is completed, the ephemeral cluster 16 may transmit the output of the job to the data lake 14. In addition to the output of the job, the ephemeral cluster 16 may transmit a done file 22 to indicate that the current job is complete. The job controller 12 may be constantly polling for the done file 22 to initiate the next job. In some embodiments, the job controller 12 may transmit the done file 22 to the data lake 14.

Executing and completing the jobs of the efficiency system 10 may require one or more specific machines with one or more specific requirements. While these jobs can be completed locally, it may prove costly to maintain multiple local machines. As such, it is advantageous to utilize a third-party service providing one or more cloud-based machines and performing the jobs of the efficiency system 10 on the one or more cloud-based machines. As described above, the third-party service may operate and lease cloud-based machines to the enterprises through direct, on-demand markets and/or an interruptible machine market on interruptible machines. The on-demand market may allow the enterprises to make sure that they will be able to utilize the cloud-based machines for as long as they need without interruption. The requesting process on interruptible machines may allow for the enterprises to utilize a cost effective option by requesting on machines that were not purchases through the on-demand market.

Figure 2:
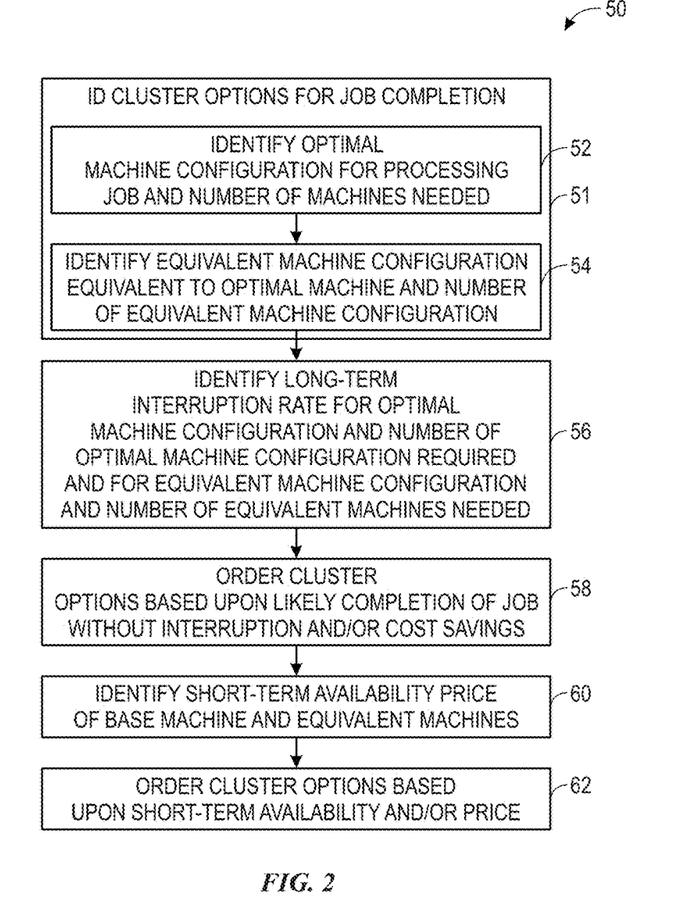
FIG. 2 illustrates a flow chart of a process for identifying cluster options for job completion and creating an ordered list for requesting the cluster options, in accordance with an embodiment.

The third-party service may release information surrounding the leasing, operating, and availability of the interruptible machines on an un-used/under-used market. Utilizing this information, required machines to carry out the jobs of the efficiency system 10 may be determined. With the foregoing in mind, FIG. 2 illustrates a flow chart of a method 50 for identifying cluster options for job completion and creating an ordered list for requesting the cluster options. Although the method 50 is described as being in a particular order, it should be noted that the method 50 may be performed in any suitable order.

First, cluster options for job completion are identified (block 51). At block 52, optimal machine configurations and a number of optimal machines may be identified for processing the job. The optimal machine configurations and the number of optimal machines may correspond to general processing requirements for completing a job within a timeframe. A machine configuration may include a total number of CPUs and total amount of memory. When identifying the optimal machine configuration, the CPU to memory ratio may be determined by the total number of CPUs and total amount of memory included in the machine configurations to identify an optimal machine configuration for processing a job. By way of example, one machine configuration may be a machine with 32 CPUs, 128 gigabytes of memory, and a ratio of 4 gigabytes of memory/CPU.

The job may require 8 machines of this example machine configuration, in which the total number of CPUs will be 256 and the total memory will be 1024 gigabytes. It should be understood that while gigabytes is utilized to describe the memory of the machines in the current embodiments, any unit of memory may be acceptable and utilized.

The third-party service may provide one or more types of machines. In some embodiments, one machine type provided by the third-party service may include optimizations different than another machine type. By way of example, one type of machine may be optimized for memory purposes, while in other embodiments, the type of machine may be optimized for processor purposes. Each machine configuration may be available in one or more different availability zones. The availability zone may be a particular geographical region. In some embodiments, depending on the types of jobs to be processed by the efficiency system 10, the ephemeral cluster 16 makeup may require all machines to be within the same availability zone. In other embodiments, no such requirement may be warranted.

In certain embodiments, the optimal machine configurations and the number of machines for processing the job may be pre-determined based upon past jobs that are within a certain similarity threshold of the current job. The similarity threshold may be determined based upon the type of job, the size of the job, the complexity of the job, and/or the like. In other embodiments, the optimal machine configurations and the number of machines for processing the job may be dynamically determined.

Identifying the ephemeral cluster 16 makeup options (block 51) may also include identifying equivalent machine configuration to the optimal machine and optimal number of optimal machines that could be used for the job completion (block 54). At block 54, equivalent machine configurations and number of equivalent machines which are equivalent to (or substantially equivalent to) the optimal machine configuration and the optimal number of machines for processing the job may be identified. In the event that the optimal machine configuration and the number of optimal machines are not available or has not become optimal anymore, the equivalent machine configurations and a corresponding equivalent number of machines having the equivalent machine configurations may become the optimal machine configurations.

The equivalent machine configurations and the number of equivalent machines may be determined based upon identifying configurations with a similar CPU to memory ratio (or memory to CPU ratio) as the optimal configuration/makeup. By way of example, the optimal machine configurations may require 8 machines with the CPU to memory ratio of 8 gigabytes/CPU. The equivalent machine configurations may be identified as 16 machines with the CPU to memory ratio of 4 gigabytes/CPU. Another equivalent machine configuration may be identified as 4 machines with the CPU to memory ratio of 16 gigabytes/CPU. These machine configuration and type equivalences may be pre-determined and utilized for all jobs. In certain embodiments, the equivalences may be dynamically determined based upon the job.

There may be multiple different options identified at block 54. That is, one or more equivalent machine configurations and a corresponding number of equivalent machines may be identified. The process of identifying the equivalent machine configurations may be performed one or more times and all of the possible equivalences may be stored along with the optimal machine configuration. The optimal machine configuration and the number of optimal machines and for the equivalent machine configurations and the number of equivalent machines may be considered cluster options for job completion.

At block 56, a long-term interruption rate for the optimal machine configuration and the number of optimal machines and for the equivalent machine configurations and the number of equivalent machines may be identified. The interruption rate of a particular machine configuration may be related to the probability that the third-party service will interrupt an in-progress job on a leased machine that was leased from the interruptible market when a lease of the machine is purchased through the on-demand market and/or a higher rate was offered by a different party for use of the interruptible. The third-party service may publish a statistic for each machine configuration and the probability that each machine configuration will be interrupted, which may be considered the long-term interruption rate. The long-term statistic may be calculated weekly, bi-weekly, monthly, or yearly.

At block 58, the cluster options may be ordered based upon a probability of completing the job without interruption on the most cost effective machines. The optimal machine configuration and the number of optimal machines along with the equivalent machine configurations and the number of equivalent machines that are considered the cluster options may be ordered into a list, where a first machine configuration/number of machines makeup set on the list corresponds to a most desirable cluster makeup option (e.g., the lowest interruption rate, the most cost-effective, and/or a particular balance between the interruption rate and cost-effectiveness). By way of example, one machine set may have a lower interruption rate than another machine set, but may be more costly. Thus, a trade-off may be made to determine which machine set is the most cost effective while still meeting certain interruption criteria.

At block 60, a short-term interruption rate (e.g., rate at which a given configuration of machine purchased on the interruptible machine market has been interrupted by purchase of the given configuration in the on-demand market) and/or a price for the optimal machine configuration and the number of optimal machines and for the equivalent machine configurations and the number of equivalent machines may be identified. The short-term interruption rate may be the interruption rate of the machine over a short time period. The short time period may be a minute, an hour, a day, or any combination thereof. By way of example, the third-party service may update the interruption rate of the machines every 10 minutes. The time period for the short-term interruption rate may be shorter than the time period for the long-term interruption rate.

The price for each machine may be updated at the same rate as the interruption rate. The price data identified may be the historical price paid for the machine (sometimes for a given availability zone) and the latest price paid for the machine (sometimes for the given availability zone). In some embodiments, the current price of the machine on the on-demand market may be identified along with the historical price paid and the latest price paid. In other embodiments, any combination of the three prices may be identified.

At block 62, the cluster options may be ordered based upon the short-term interruption rate and/or the price information. In some embodiments, a short-term pricing/availability rate (e.g., expected short-term price and/or predicted non-interrupted availability) may be calculated based upon continually updated data related to the short-term interruption rate, the current offered prices, the offered prices of related machine configurations, and/or the availability of the requested machines within particular availability zones. In some embodiments, the price information may be the price information collected at block 60. In certain embodiments, the ordered list created at block 58 may be re-organized based upon the data collected at block 60. This new list may be ordered in the same process as the ordered list of block 58, where the first machine set on the list corresponds to the lowest short-term interruption rate that is the most cost-effective. In other embodiments, re-ordering the ordered list may require the identification of new equivalent machine configurations and the number of equivalent machines. This may occur if more than a threshold number of machines of a certain equivalent machine configuration have been purchased on the on-demand market at any time during the method 50. It should be noted that each machine configuration may be paired with a rank, which determines the order of the list. In an aspect, the order of the list may be determined based on just the ordering in block 58 without the ordering in block 62 or based on just the ordering in block 62 without the ordering in block 58.

Figure 3:
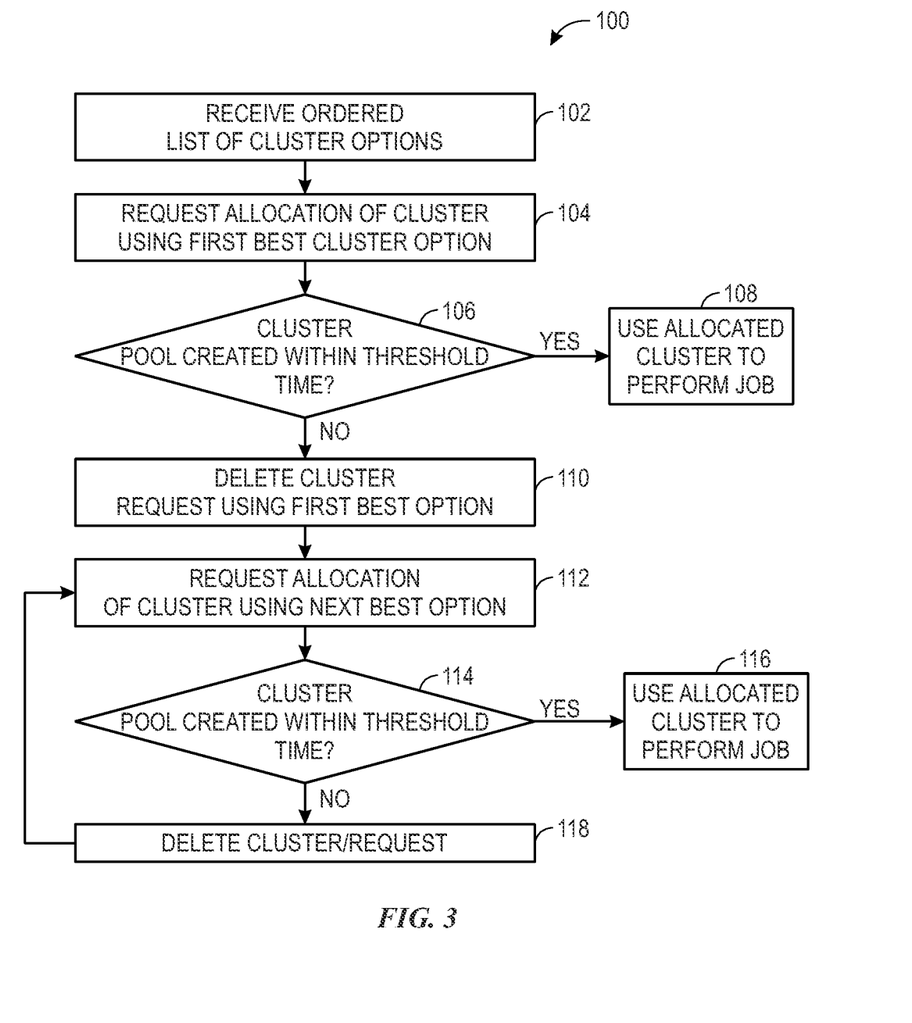
FIG. 3 illustrates a flow chart of a process for requesting allocation of cluster options, in accordance with an embodiment.

Once an updated ordered list is obtained, the process of allocating the clusters to process the job may begin. The ordered list may contain one or more different machine configurations, each with an assigned rank that determines the order that each machine configuration will be attempted to be purchased and allocated. With the foregoing in mind, FIG. 3 illustrates a flow chart of a method 100 for requesting allocation of cluster options by requesting one option at a time until the request is fulfilled. Although the method 100 is described as being in a particular order, it should be noted that the method 100 may be performed in any suitable order.

At block 102, the ordered list of the cluster options may be received. The ordered list of the cluster options may include the list of the optimal machine configuration and the one or more equivalent machine configurations, the long-term and short-term interruption date for each machine configuration, and/or the price information of each machine configuration. In some embodiments, the ordered list of the cluster options may be evaluated again before allocation begins.

At block 104, the allocation of a cluster using the highest ranked cluster option may be requested. The highest ranked cluster option may include the machine configuration, the number of machines, and/or the availability region. A proposed pricing may also be provided in the allocation request, indicating a price offered for use of the cluster option. The machines may be requested within the availability region for allocation of clusters to begin job processing.

At block 106, a determination may be made as to whether the cluster is created within a threshold time. In some embodiments, the threshold time may be pre-determined. In other embodiments, the threshold time may be dynamically determined based upon the long-term interruption rate, the short-term interruption rate, the availability of different types of machine configurations, the price of each machine configuration, and/or any other information collected and utilized during the cluster allocation and machine ordering processes of method 50 and method 100.

At block 108, when the cluster is allocated, the allocated cluster may be used to perform jobs. The allocated cluster and respective cluster instances may begin to perform the required jobs of the efficiency system 10 as soon as possible. In other embodiments, the jobs may begin after a specific amount of time has passed to ensure that interruption of jobs does not immediately occur after allocation is successful. In certain embodiments, the machine configuration information, the availability zone, the price, and/or the long-term and short-term interruption rates that resulted in the allocated cluster may be stored for future usage (e.g., as historical usage used to prioritize future cluster options, as discussed in FIG. 2 above).

At block 110, when the cluster is not allocated within the threshold amount of time, the cluster request may not be fulfilled using the highest rank cluster option and the request is deleted. In some embodiments, an indication of the failure of the highest rank cluster to allocate may be stored for future determinations for the ordered list (e.g., as historical usage used to prioritize future cluster options, as discussed in FIG. 2 above).

At block 112, the allocation of a next highest rank cluster option may be requested. The next highest rank may be related to a next best option for the allocation of the cluster based upon the machine configuration, the number of machines, and/or the availability region. In some embodiments, the ranking of each cluster option may be changed to the next highest rank.

At block 114, a determination may be made as to whether the next-best cluster is created within a threshold time. As described above, the threshold time may be pre-determined. In other embodiments, the threshold time may be dynamically determined based upon the long-term interruption rate, the short-term interruption rate, the availability of different types of machine configurations, the price of each machine configuration, and/or any other information collected and utilized during the cluster allocation and machine ordering processes of method 50 and method 100.

At block 116, when the cluster is allocated within the threshold amount of time, the allocated cluster may be used to perform jobs. As described above at block 108, the allocated cluster and respective clusters may begin to perform the required jobs of the efficiency system 10 as soon as possible. In other embodiments, the jobs may begin after a specific amount of time has passed to ensure that interruption of jobs does not immediately occur after allocation is successful. In certain embodiments, the machine configuration information, the availability zone, the price, and/or the long-term and short-term interruption rates that resulted in the allocated cluster may be stored for future usage.

In some embodiments, the machine configurations desired to process the data may have high interruption rates. The ordered list may be compensated with extra equivalent machine configurations to ensure that enough machines are booked to ensure that the jobs will be completed.

At block 118, when the cluster request is not fulfilled using the next highest rank cluster option within the threshold amount of time, the request is deleted. Once the cluster request is deleted, the next highest rank after the current cluster option may be requested for allocation at block 112. In some embodiments, the ordered list of cluster options may be dynamically changed based upon the failure of certain cluster options to allocate.

Figure 4:
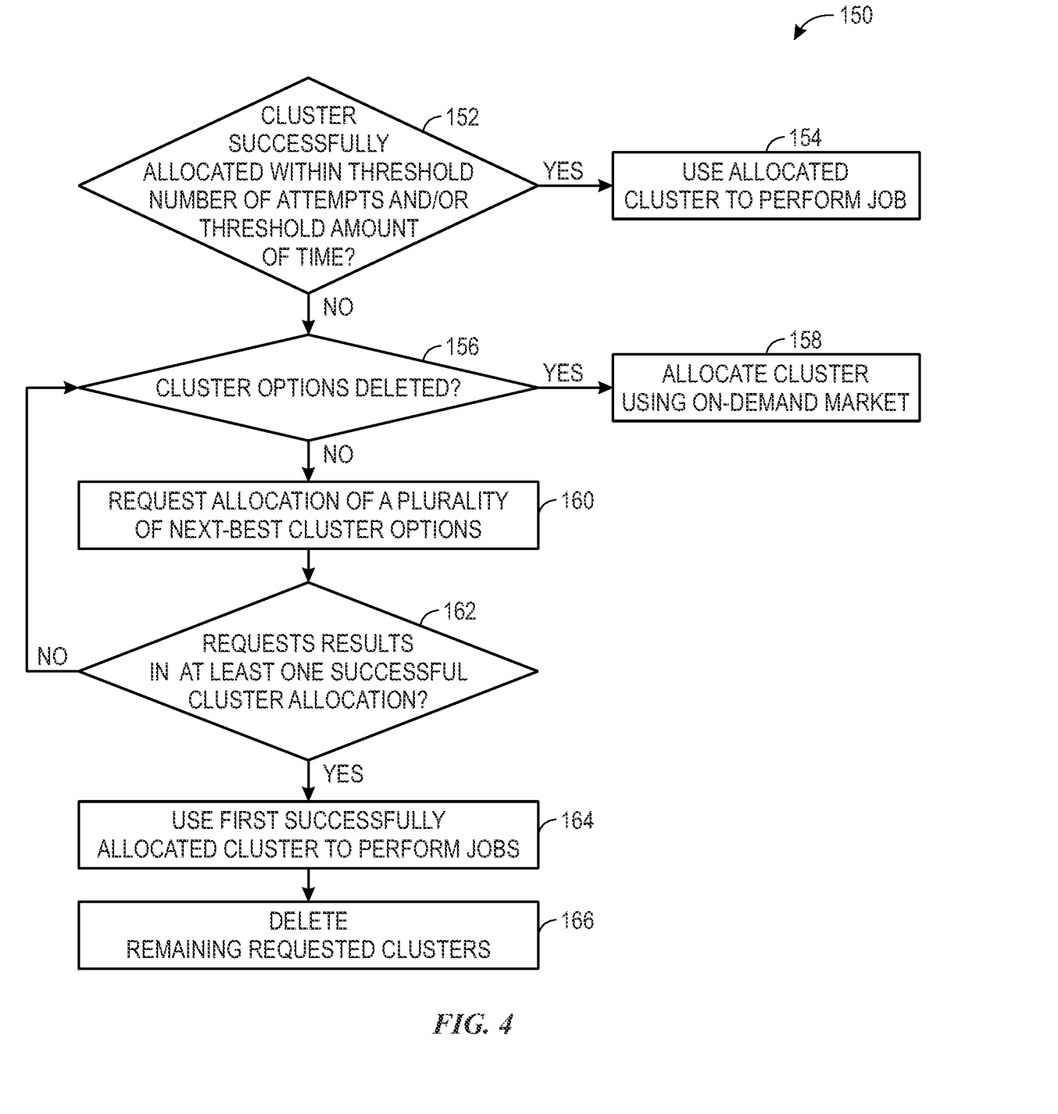
FIG. 4 illustrates a flow chart of a process for requesting allocation of cluster options by requesting a plurality of cluster options following first two best options until the request is fulfilled, in accordance with an embodiment.

The method 100 may continue to loop as the cluster options are parsed through and requests for the allocation of the cluster options occur. For example, the operations at blocks 112 and 114 (including the related blocks) may be repeated any number of times until an allocation request is successful. However, this may prove inefficient and, moreover, lead to the failure of completing the required jobs to process the required data of the efficiency system 10 within a requisite amount of time. With the foregoing in mind, FIG. 4 illustrates a flow chart of a process 150 for requesting allocation of cluster options by requesting a plurality of cluster options.

At block 152, a determination may be made as to whether the cluster is successfully allocated within a threshold number of attempts and/or a threshold amount of time. The threshold number of attempts and/or amount of time may be pre-determined. In other embodiments, the threshold number of attempts and/or amount of time may be dynamically determined based upon the ordered list, the information utilized to create the ordered list, and/or characteristics of the job (e.g., time-criticality, importance, etc.). By way of example, a threshold number of attempts may be set before allocation begins to two attempts. In another example, the threshold number of attempts may be modified from two to three attempts based upon the type of machine configuration, the availability zone of the previous allocation attempts (i.e. if a particular machine configuration does not allocate within the threshold time of method 100), and/or a time-criticality or importance of the job to be performed by the cluster.

At block 154, when the cluster is allocated within the threshold number of attempts and/or threshold amount of time, the allocated clusters may be used to perform the job. As described above, the allocated cluster may begin to perform the required job of the efficiency system 10 as soon as possible. In other embodiments, the job may begin after a specific amount of time has passed to ensure that interruption of jobs does not immediately occur after allocation is successful. In certain embodiments, the machine configuration information, the availability zone, the price, and/or the long-term and short-term interruption rate that resulted in the allocated cluster may be stored for future usage (e.g., as historical usage used to prioritize future cluster options, as discussed in FIG. 2 above).

At block 156, when the cluster is not successfully allocated within the threshold number of attempts and/or a threshold amount of time, a determination is made as to whether there are more cluster options on the ordered list to attempt to allocate. In some embodiments, this may be done by identifying whether the cluster options list includes any more options.

At block 158, when the cluster options have been depleted, the clusters are allocated through the on-demand market. That is, the full price for allocating clusters may be paid and the optimal machine configuration and the number of optimal machines will be purchased and utilized using "on demand" pricing. In some embodiments, an indication of the failed cluster options may be stored for future usage (e.g., as historical usage used to prioritize future cluster options, as discussed in FIG. 2 above). In other embodiments, the best available machine configurations may be purchased and utilized.

At block 160, when cluster options have not been depleted, the allocation of a plurality of the next highest ranked cluster options may be requested in parallel (when a plurality of next best options are still available). It may be more efficient to attempt to simultaneously allocate multiple cluster options at a time instead of a single cluster option at a time to ensure that the job is initiated and completed in a timely manner. On repeated allocation attempts, the number of cluster options attempted in parallel may be progressive. That is, the number of cluster options to attempt in parallel may increase as the number of allocation attempts and/or the elapsed time without successful allocation increases. By way of example, if a first parallel allocation attempt attempts allocating 3 cluster options, then a subsequent parallel allocation attempt may attempt allocating 6 cluster options in parallel. However, in some embodiments, the plurality of cluster options may not change the number of cluster options that are attempted.

At block 162, a determination may be made as to whether the plurality of cluster options allocation requests results in at least one successful cluster allocation. Each cluster allocation may follow the process of waiting for either a successful allocation or the threshold time of method 100. In some embodiments, each cluster allocation of the plurality of cluster options allocations may be checked in parallel. In other embodiments, each cluster allocation of the plurality of cluster options allocations may be checked one at a time.

At block 164, the first of the plurality of cluster option allocation requests that results in at least one successful cluster allocation is used for job processing. In some embodiments, a most cost-effective option will be chosen (e.g., in lieu of the first successful allocation and/or when multiple successful allocations occur within a threshold amount of time). As described above, the allocated cluster may begin to perform the required job of the efficiency system 10 as soon as possible. In other embodiments, the job may begin after a specific amount of time has passed to ensure that interruption of jobs does not immediately occur after allocation is successful. In certain embodiments, the machine configuration information, the availability zone, the price, and/or the long-term and short-term interruption rate that resulted in the allocated cluster may be stored for future usage (e.g., as historical usage used to prioritize future cluster options, as discussed in FIG. 2 above).

At block 166, the other requests of the plurality of cluster option allocation requests (e.g., the ones not selected for job processing) may be deleted. In certain embodiments, the number of allocation requests and their particular makeups may be stored for future usage (e.g., as historical usage used to prioritize future cluster options, as discussed in FIG. 2 above).

Figure 5:
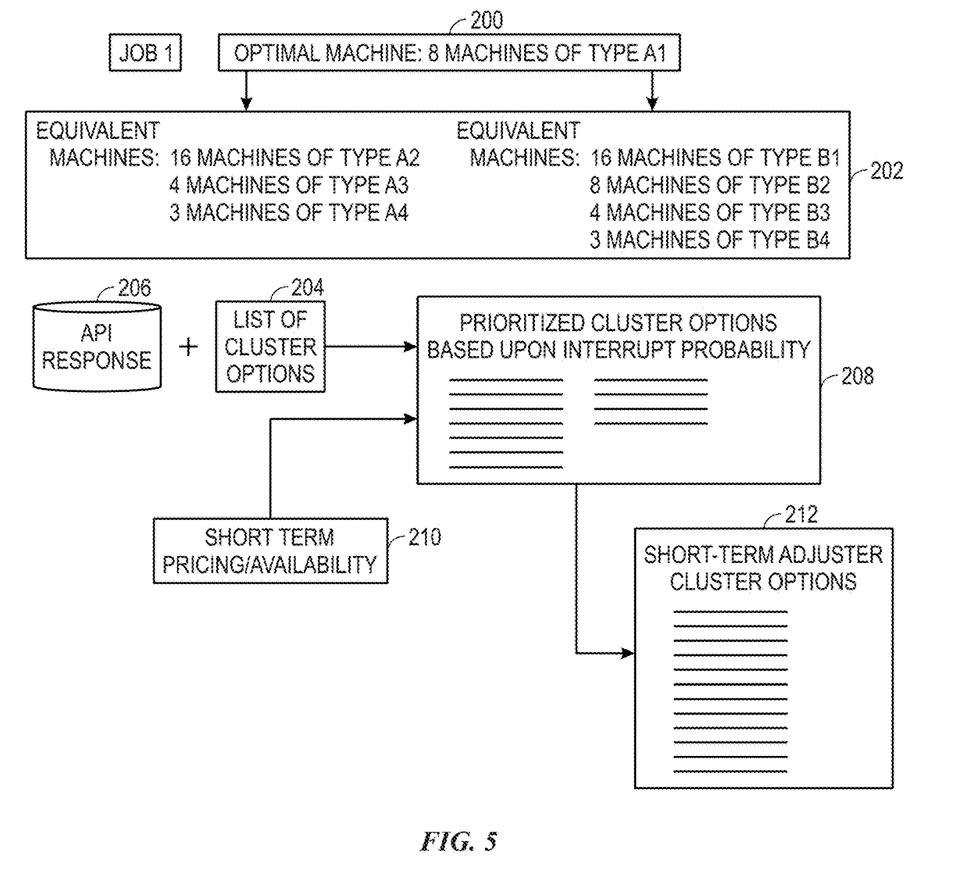
FIG. 5 illustrates an example implementation of the process to identify and allocate clusters based upon prioritized cluster options, in accordance with an embodiment.

With the foregoing in mind, FIG. 5 illustrates an example of the process to identify and allocate clusters based upon best available cluster options. An optimal machine set 200 may be determined to be eight machines of a Type A1 machine configuration from the data platform, which has a processor-prioritized configuration with 128 GB of memory and 32 CPUs (and thus a 4 gigabyte to CPU ratio). The optimal machine set 200 may be determined based upon the type of job and the amount of data in the data lake 14 required for the job. The equivalent machine sets 202 may be determined based upon the optimal machine set 200. As discussed above, the memory to CPU ratio is the most significant determining factor when determining equivalent machine sets 202. Other important factors may be the number of machines, the availability of certain machine configurations within certain availability zones, and/or any other factor that is affected by the type of job and the amount of data.

Shown in the equivalent machine sets 202 are some examples of machine sets with the number of machines and the machine configurations that are equivalent to the optimal machine set 200. By way of example, one equivalent machine configuration may be 16 machines of a Type A2 configuration, which has a 64 GB and 16 CPU configuration (and thus a 4 gigabytes/CPU ratio) or 4 machines of a Type A3 configuration, which has a configuration of 256 GB and 64 CPUs (and thus a 4 gigabytes/CPU ratio). As described above, there may be more than one type of machine that is equivalent. By way of example, a first set of equivalences may be processor-optimized (e.g., Type A machines), while a second set of equivalences may be memory-optimized (e.g., Type B machines, which is a different family of machines that maintains the 4 gigabytes/CPU ratio). Different types of machine configurations and numbers of machines within each of these optimizations may be created and stored. In some embodiments, the processor-optimized and memory-optimized machines may be sorted into different classes of machines, where a certain class of machines may be preferred before another class of machines. By way of example, if the optimal machine configuration is the Type A2, then the first equivalent machine class may list machines in a common class (e.g., Type A instances, which are processor-optimized configurations) and the second equivalent machine class may list machines with memory-optimized configurations (e.g., Type B instances).

The optimal machine set 200 and the equivalent machine sets 202 may be listed as an unordered list of cluster options 204. To order the list, an API response 206 may be determined and the factors utilized to rank each cluster option can be obtained. These factors may include the long-term interruption rate, the historical pricing information, and the available machine configurations within each availability zone.

In combination with the API response 206, the unordered list of cluster options 204 may be converted into a prioritized cluster options list 208. The prioritized cluster options list 208 may be primarily organized based upon the interruption rate and/or cost factors determined from the API response 206. The cluster options may be ordered through a ranking system, where the best option for cluster allocation is ranked the highest and the list continues down in order of next best cluster option.

The prioritized cluster options list 208 is further ordered and changed based upon the short-term pricing/availability 210. As described above, the short-term pricing/availability 210 may be based upon continually updated data related to the short-term interruption rate, the current offered prices, the offered prices of related machine configurations, and/or the availability of the requested machines within particular availability zones. Based upon the short-term pricing/availability 210, the prioritized cluster options list 208 may be converted into a short-term adjusted cluster option list 212. The short-term adjusted cluster option list 212 may contain the final list before the cluster allocation process begins.

Figure 6:
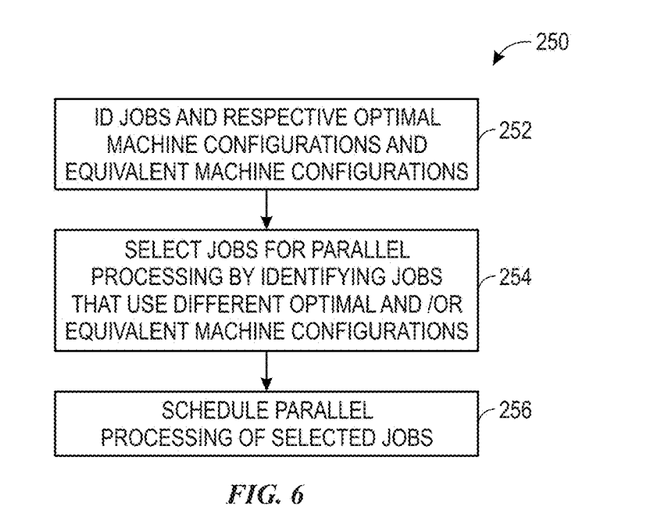
FIG. 6 illustrates a flow chart of a process for scheduling jobs for parallel processing, in accordance with an embodiment.

As discussed above in respect to FIGS. 3 and 4, the cluster option allocation process attempts to allocate the highest ranked cluster option for a job during the process. Before another job may begin, the job controller 12 may check for the done file 22 of the current job. This may prove to be a bottleneck where a new job cannot be processed until the current job is finished. As such, FIG. 6 illustrates a flowchart of a process 250 for scheduling jobs for parallel processing when each job uses different machine configurations and are not likely to create competition in allocating clusters using the interruptible market.

At block 252, two or more jobs and the respective optimal machine configurations and the number of the optimal machines and the respective equivalent machine configurations and the number of the equivalent machine configurations may be identified. As described in FIG. 2, in identifying the optimal and equivalent machine configuration, the memory to CPU ratio may be utilized along with other machine configuration factors. Different jobs may require different machine configurations. By way of example, one job may require more complex operations and require a higher memory to CPU ratio compared to another job that may require relatively simple operations that use machines with a different (e.g., lower) ratio of resources. Thus, these two jobs may use wholly different configurations and may not be at risk of competing with one another when requesting cluster allocations on the interruptible market.

At block 254, two or more jobs may be selected for parallel processing by identifying jobs that require different optimal and/or equivalent machine configurations. In some embodiments, the cluster options list for each job created in FIG. 2 may be compared to one another to identify whether cluster options overlap. If the number of similar machine configuration options between each job is below an overlap threshold, then the compared jobs may be selected for parallel processing. Returning to our example jobs discussed above, because the two jobs use wholly different configurations, no overlapping cluster options are found and, thus, the two jobs may be performed in parallel (assuming all other technical constraints allow for such implementation).

At block 256, the selected jobs may be scheduled for parallel processing. In some embodiments, the jobs to be run on the efficiency system 10 may be generated when the data lake 14 is created. The generated jobs may be scheduled for parallel processing with two or more being processed at any given time. In other embodiments, two or more jobs may be generated at a time after the data lake 14 is created to save on processing power and time. As jobs are generated, they are evaluated and selected at 254 and scheduled from processing at block 256.

By employing the techniques described in the present disclosure, the systems and the methods described herein may allow for the optimization of cost for big data processing by allocating clusters in a cost-effective and efficient manner. The efficiency system 10 may utilize the job controller 12 to allocate the ephemeral cluster 16 with one or more instances 20 to complete the job utilizing the data of the data lake 14. In some embodiments, the optimal and the equivalent machine configurations and the respective numbers of machines may be identified to complete the job of the efficiency system 10. Utilizing the identified machines and both short-term and long-term interruption rates, the ordered list with the ordered respective machines may be created and each machine configuration may be requested to perform the jobs. In certain embodiments, two or more jobs may be selected for parallel processing to maximize resources and minimize time spent processing the data of the data lake 14.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A tangible, non-transitory, machine-readable medium, comprising machine-readable instructions that, when executed by one or more processors, cause the one or more processors to:
   determine an optimal cluster option for a cloud-based data processing job from a set of machine configurations offered by a cloud service, wherein the optimal cluster option comprises an optimal configuration and a corresponding optimal number of machines having the optimal configuration;
   determine, from the set of machine configurations, one or more equivalent cluster options offered by the cloud service comprising equivalent configurations and a corresponding equivalent number of machines having the equivalent configuration to the optimal configuration, by:
      identifying a memory to central processing unit (CPU) ratio of the optimal configuration and the corresponding optimal number of machines; and
      identifying, from the set of machine configurations, one or more machine configurations that match or exceed the memory to CPU ratio along with a corresponding number of machines that would match or exceed a total memory, total CPU power, or both of the optimal configuration and the corresponding optimal number of machines;
   request and receive, via an application programming interface (API) call to cloud service, an electronic indication of long-term interruption rates, short-term availability, expected pricing or any combination thereof of the cloud service;
   generate an ordered cluster options list that prioritizes the optimal cluster option and the one or more equivalent cluster options based upon the long-term interruption rates, the short-term availability, the expected pricing or any combination thereof; and
   cause execution of the data processing job by the cloud service, by:
      providing an electronic request, to the cloud service, based on the ordered cluster options list, the electronic request indicating a request to allocate a cluster to implement the data processing job; and
      submitting the cloud-based data processing job to the cloud service to trigger execution of the cloud-based data processing job at the allocated cluster of the cloud service.

2. The tangible, non-transitory, machine-readable medium of claim 1, comprising machine-readable instructions that, when executed by the one or more processors, cause the one or more processors to:
   electronically request the allocation by iteratively electronically requesting the allocation of the cluster to implement the data processing job using the ordered cluster options list by:
      determining whether a previous electronic request for allocation of the cluster was satisfied within a threshold amount of time;
      when the previous electronic request for allocation was satisfied within the threshold amount of time, using a resultant allocated cluster of the previous electronic request to implement the data processing job; and
      otherwise, when the previous electronic request for allocation was not satisfied within the threshold amount of time, electronically requesting another allocation based on the ordered cluster options lists.

3. The tangible, non-transitory, machine-readable medium of claim 2 comprising machine-readable instructions that, when executed by the one or more processors, cause the one or more processors to:
   when the previous electronic request for allocation was not satisfied within the threshold amount of time, delete the previous electronic request.

4. The tangible, non-transitory, machine-readable medium of claim 1, comprising machine-readable instructions that, when executed by the one or more processors, cause the one or more processors to:
   iteratively electronically request the allocation of the cluster to implement the data processing job using the ordered cluster options list by:
      determining whether the cluster is successfully allocated within a threshold number of attempts, a threshold amount of attempt time, or both;

when the cluster is successfully allocated within the threshold number of attempts, the threshold amount of attempt time, or both, use the cluster to implement the data processing job; and otherwise, when the cluster is not successfully allocated within the threshold number of attempts, the threshold amount of attempt time, or both, electronically request, in a plurality of electronic cluster allocation requests, cluster allocation using two or more cluster options.

5. The tangible, non-transitory, machine-readable medium of claim 1, comprising machine-readable instructions that, when executed by the one or more processors, cause the one or more processors to:

generate the ordered cluster options list by ranking the optimal cluster option and the one or more equivalent cluster options based upon respective long-term interruption rates, first and then based upon short-term availability, expected pricing or both.

6. The tangible, non-transitory, machine-readable medium of claim 1, comprising machine-readable instructions that, when executed by the one or more processors, cause the one or more processors to:

iteratively electronically request allocation of the cluster based on the ordered cluster options list in a prioritized manner in an interruptible environment in lieu of an uninterruptible environment.

7. The tangible, non-transitory, machine-readable medium of claim 6, comprising machine-readable instructions that, when executed by the one or more processors, cause the one or more processors to:

when the optimal cluster option and the one or more equivalent cluster options are depleted, electronically request the optimal cluster option from the uninterrupted environment.

8. The tangible, non-transitory, machine-readable medium of claim 1, comprising machine-readable instructions that, when executed by the one or more processors, cause the one or more processors to:

poll for a done file indicating completion of the data processing job; and upon detecting the done file, schedule implementation of a second data processing job.

9. The tangible, non-transitory, machine-readable medium of claim 1, comprising machine-readable instructions that, when executed by the one or more processors, cause the one or more processors to:

identify a second data processing job to implement in parallel with the data processing job, wherein the second data processing job is identified as not using the optimal cluster option or the one or more equivalent cluster options.

10. A system, comprising:

a data repository comprising data to be processed;

cluster allocation logic comprising a processor, configured to:

identify an optimal cluster option, from a plurality of cluster options offered by a cloud service, to allocate as a cloud service cluster tasked with performing a cloud-based processing job on the data, wherein the optimal cluster option is selected based upon respective long-term interruption rates, short-term availability, expected pricing or any combination thereof of the plurality of cluster options and the optimal cluster option comprises an optimal machine configuration and a corresponding optimal number of machines for implementing the processing job;

identify, from the plurality of cluster options, one or more equivalent cluster options to the optimal cluster option, the one or more equivalent cluster options comprising equivalent machine configurations and a corresponding equivalent number of machines to the optimal configuration and the corresponding optimal number of machines;

generate an ordered cluster options list having a prioritized order based upon respective known long-term interruption rates, short-term availability, expected pricing or any combination thereof, wherein the ordered cluster options list comprises the optimal cluster option and the one or more equivalent cluster options; and provide the ordered cluster options list to a job scheduler for scheduling the processing job via prioritized cluster allocation attempts; and the job scheduler communicatively coupled to the cluster allocation logic, configured to:

receive the ordered clustered options list from the cluster allocation logic; and in response to receiving the ordered clustered options list, trigger, at a cloud service, execution of a processing job to process the data, by iteratively attempting to allocate the cluster in the prioritized order in an un-interruptible environment until the cluster is allocated or the optimal cluster option and all the one or more equivalent cluster options in the ordered cluster options list are depleted without successful allocation of the cluster, each iterative attempt comprising:

providing an electronic request to the cloud service, the electronic request requesting, from the cloud service, allocation of the cloud service cluster in accordance with a highest prioritized cluster option that has not yet been attempted for allocation by the cluster allocation logic; and upon allocation of the cloud service cluster, submitting the processing job to the cloud service to trigger execution of the processing job at the allocated cloud service cluster.

11. The system of claim 10, wherein the job scheduler is configured to electronically request allocation of the cluster in the un-interruptible environment when the optimal cluster option and all the one or more equivalent cluster options in the ordered cluster options list are depleted without successful allocation of the cluster.

12. The system of claim 10, wherein the cluster allocation logic is configured to identify the one or more equivalent cluster options, by:

identifying a memory to central processing unit (CPU) ratio of the optimal machine configuration; and identify, from the plurality of cluster options, machine configurations that match or exceed the memory to CPU ratio and a corresponding number of machines that would match or exceed memory and CPU resources of the optimal machine configuration, as the one or more equivalent cluster options.

13. A method for resource allocation, comprising:

identifying, from a set of machine configurations offered by a cloud service, an optimal configuration and a corresponding optimal number of machines as an optimal cluster option for implementation of a cloud-based data processing job;

identifying, from the set of machine configurations, one or more equivalent cluster options offered by the cloud service comprising equivalent configurations and a corresponding equivalent number of machines to the optimal configuration and the corresponding optimal number of machines, by:
    identifying a memory to central processing unit (CPU) ratio of the optimal configuration and the corresponding optimal number of machines; and
    identifying, from the set of machine configurations, one or more machine configurations that match or exceed the memory to CPU ratio along with a corresponding number of machines that would match or exceed a total memory, total CPU power, or both of the optimal configuration and the corresponding optimal number of machines;
prioritizing, in a prioritized order in an ordered cluster options list, the optimal cluster option and the one or more equivalent cluster options, based upon respective long-term interruption rates, short-term availability, expected pricing or any combination thereof; and
iteratively electronically requesting, from the cloud service, in the prioritized order, allocation of a cluster to implement the data processing job using the optimal cluster option and the one or more equivalent cluster options, until the allocation of the cluster succeeds or the optimal cluster option and the one or more equivalent cluster options are depleted; and
upon the allocation of the cluster succeeding, provide the data processing job to the allocated cluster.

14. The method of claim 13, comprising:
iteratively electronically requesting the allocation of the cluster to implement the data processing job using the optimal cluster option and the one or more equivalent cluster options, by:
    determining whether a previous electronic request for allocation of the cluster was satisfied within a threshold amount of time;
    when the previous electronic request for allocation was satisfied within the threshold amount of time, using a resultant allocated cluster of the previous electronic request for the implementation of the data processing job; and
    otherwise, when the previous electronic request for allocation was not satisfied within the threshold amount of time, requesting another cluster to implement of the data processing job.

15. The method of claim 14, comprising:
iteratively electronically requesting, in the prioritized order, allocation of the cluster to implement the data processing job using the ordered cluster options list in an interruptible environment in lieu of an uninterruptible environment; and
when the optimal cluster option and the one or more equivalent cluster options are depleted, electronically request the optimal cluster option from the uninterrupted environment.

16. The method of claim 13, comprising:
iteratively electronically requesting the allocation of the cluster to implement the data processing job using the ordered cluster options list by:
    determining whether the cluster is successfully allocated within a threshold number of attempts, a threshold amount of attempt time, or both;
    when the cluster is successfully allocated within the threshold number of attempts, the threshold amount of attempt time, or both, use the cluster to implement the data processing job; and
    otherwise, when the cluster is not successfully allocated within the threshold number of attempts, the threshold amount of attempt time, or both, electronically request, in a plurality of electronic cluster allocation requests, cluster allocation using two or more cluster options.

\* \* \* \* \*